United States Patent [19]

Akagi

[11] Patent Number: 4,965,962
[45] Date of Patent: Oct. 30, 1990

[54] HYDROPONIC CULTURE SYSTEM

[75] Inventor: Shizuka Akagi, Chiba, Japan

[73] Assignee: Q. P. Corporation, Tokyo, Japan

[21] Appl. No.: 391,679

[22] Filed: Aug. 9, 1989

Related U.S. Application Data

[63] Continuation-in-part of Ser. No. 49,697, May 13, 1987.

[30] Foreign Application Priority Data

| Nov. 21, 1984 | [JP] | Japan | 59-244664 |
| Jun. 7, 1985 | [JP] | Japan | 60-122752 |
| May 21, 1986 | [JP] | Japan | 61-114742 |
| Jun. 12, 1986 | [JP] | Japan | 61-124330 |
| Oct. 30, 1986 | [JP] | Japan | 61-257014 |
| Nov. 21, 1986 | [JP] | Japan | 61-276720 |
| Dec. 12, 1986 | [JP] | Japan | 61-282025 |

[51] Int. Cl.$^5$ ............................................. A01G 31/02
[52] U.S. Cl. ............................................. 47/65; 47/62; 47/64
[58] Field of Search ............................ 47/59–65, 47/17

[56] References Cited

U.S. PATENT DOCUMENTS

| 2,931,579 | 4/1960 | Ruddell | 239/210 X |
| 3,295,763 | 1/1967 | Brauner | 239/173 |
| 3,348,922 | 10/1967 | Bose et al. | 47/62 X |
| 3,673,733 | 7/1972 | Allen | 47/17 X |
| 4,059,922 | 11/1977 | Di Giacinto | 47/59 X |
| 4,074,856 | 2/1978 | Williams et al. | 47/17 X |
| 4,163,342 | 8/1979 | Fogg et al. | 47/62 X |
| 4,452,230 | 6/1984 | Nelson | 47/17 X |

FOREIGN PATENT DOCUMENTS

| 1026145 | 2/1953 | France | 47/62 |
| 1266589 | 6/1961 | France | 47/61 |
| 2341263 | 2/1976 | France | 47/64 |
| 988240 | 1/1983 | U.S.S.R. | 47/62 |
| 1085560 | 4/1984 | U.S.S.R. | 47/65 |
| 1443326 | 7/1976 | United Kingdom | 47/62 |

Primary Examiner—Robert A. Hafer
Assistant Examiner—Kevin G. Rooney
Attorney, Agent, or Firm—Rosen, Dainow & Jacobs

[57] ABSTRACT

A hydroponic culture system comprising an angle panel having a plurality of holes for supporting plants with roots projecting through the holes, and a hydroponic solution feeding means comprising a hydroponic solution spraying means for supplying a hydroponic solution onto the roots of the plants and a hydroponic solution pumping means for supplying the hydroponic solution to the hydroponic solution spraying means, in which the hydroponic solution spraying mechanism is movable along the longitudinal direction of the angle panel, or the angle panel is disposed in a plant cultivation structure which is supplied with carbon dioxide through a duct for controlling the environment within the structure, or a plurality of angle panels are disposed in a plurality of rows and top edges of the adjacent angle panel rows are connected with canopies to form substantially triangular-sectioned spaces between the adjacent angle panel rows for enhanced lighting efficiency, thereby cultivating the plants systematically and almost uniformly with improved cultivation efficiency and economy.

28 Claims, 16 Drawing Sheets

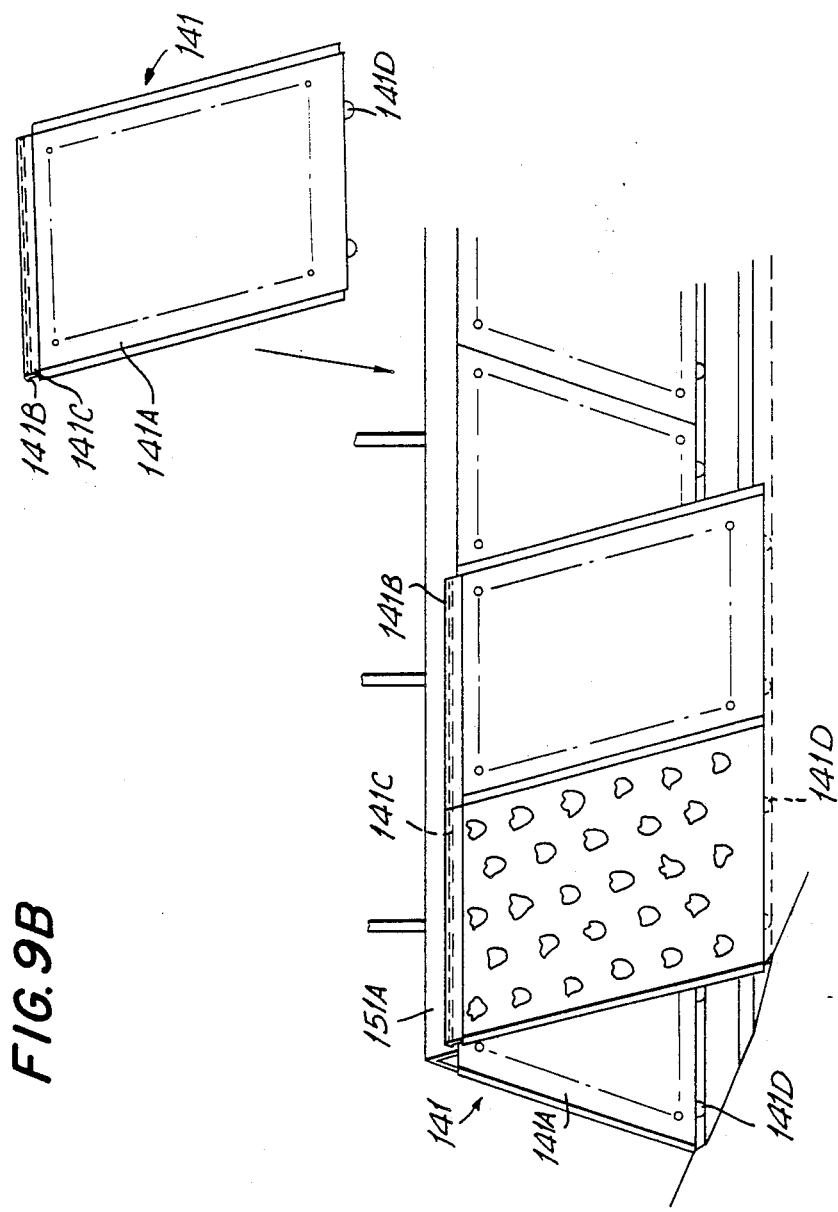

HYDROPONIC CULTURE SYSTEM

This application is a continuation in part of application Ser. No. 049,697, filed May 13, 1987.

BACKGROUND OF THE INVENTION

This invention relates to a hydroponic culture system which provides systematic, economical, and very workable hydroponic culture for almost uniform plants.

A conventional art hydroponic culture system has been disclosed in Japanese Patent Publication Laying-open No. 91833/1974. In this system, as shown in FIG. 20, plants are supported on an angle panel 01 having a number of holes; the plants are supplied with sunshine through a transparent arch roof 02, and with a hydroponic solution sprayed onto the roots of the plants from a hydroponic solution spraying mechanism 03 as shown in FIG. 21, to cultivate the plants. The hydroponic solution spraying mechanism 03 is fixed inside the angle panel 01 and is provided with a number of spray nozzles disposed along the longitudinal direction of the angle panel 01 to spray the hydroponic solution to the roots of the plants. The grown plants are harvested by removing panels 01a supporting the plants, as shown in FIG. 22.

The above-described conventional art hydroponic culture system has disadvantages including:

(1) Since sunlight is used as it occurs naturally, the growth rate and the harvest time of the plants vary with climatic or sunshine conditions (duration, direction and intensity of sunshine).

(2) At the harvest the panels 01a must be carried out of the system and new panels 01a are mounted, thus requiring a substantial time for the harvest.

(3) The entire hydroponic solution spraying mechanism is very long and has a number of spray nozzles, thus requiring a large amount of hydroponic solution to be recirculated with a high supply pressure.

(4) To assure a constant spraying pressure for each spray nozzle, the piping design becomes complicated and large in size.

(5) Since there is a substantial distance between the spray nozzles, there occurs a difference in the amount of the hydroponic solution sprayed depending on the position of each nozzle, resulting in different growth rates between the cultured plants.

(6) If some of the spray nozzles become clogged, the spraying operation becomes inconsistent, and there occurs a substantial difference in growth rate of the plants corresponding to the clogged nozzles relative to those corresponding to the normal or unclogged nozzles.

The use of artificial light has been considered to cultivate the plants with a uniform growth rate; however, this method requires a large amount of photo-energy since the lighting efficiency is low, which is impractical from an economical point of view.

SUMMARY OF THE INVENTION

With a view to obviate all of the conventional art hydroponic culture systems, it is a primary object of the present invention to provide a hydroponic culture system which can cultivate plants almost uniformly with improved economy and workability.

In accordance with the present invention which attains the above object, there is provided a first embodiment hydroponic culture system comprising an angle panel having an angular cross section with a plurality of holes for supporting plants with roots projecting through the holes, and a hydroponic solution feeding mechanism comprising a hydroponic solution spraying mechanism for supplying a hydroponic solution onto the roots of the plants and a hydroponic solution pumping mechanism for supplying the hydroponic solution to the hydroponic solution spraying mechanism. The spraying mechanism is movable along a longitudinal direction of the angle panel, and the system further comprises a driving means for moving the spraying mechanism along the longitudinal direction.

A second embodiment according to the present invention is a hydroponic culture system comprising an angle panel arranged in a plant cultivation structure, the angle panel having a plurality of holes for supporting plants with roots projecting through the holes, and a hydroponic solution feeding mechanism comprising a spraying mechanism for supplying a hydroponic solution onto the roots of the plants and a hydroponic solution pumping mechanism for supplying the hydroponic solution to the hydroponic solution spraying mechanism. This system further comprises an environment control means consisting of a measuring device for measuring the concentration of carbon dioxide in air sampled in a duct means for conducting air between a space defined by the plant cultivation structure and an air-conditioning unit. The system also comprises a carbon dioxide outlet port communicating with the duct means, a carbon dioxide supply duct connecting the carbon dioxide outlet port and a carbon dioxide supply source and having an electromagnetic valve, and a control means for controlling the electromagnetic valve in dependence on the concentration of carbon dioxide measured by the carbon dioxide concentration measuring device, whereby the concentration of carbon dioxide in the the space defined by the plant cultivation structure can be adjusted to a predetermined value.

The third embodiment according to the present invention is a hydroponic culture system comprising an angle panel having a plurality of holes for supporting plants with roots projecting through the holes, and a hydroponic solution feeding mechanism comprising a hydroponic solution spraying mechanism for supplying a hydroponic solution onto the roots of the plants and a hydroponic solution pumping means for supplying the hydroponic solution to the spraying means. The angle panel is disposed within a plant cultivation structure shielded from sunlight, the system further comprising a lighting apparatus for irradiating the plants supported on the angle panel, and a control means for controlling the environment within the plant cultivation structure.

A fourth embodiment according to the present invention is a hydroponic culture system comprising a plurality of angle panels arranged in a plurality of rows within a plant cultivation structure shielded from sunlight, each of the angle panels comprising two panels with upper edges joined, each panel having a plurality of holes for supporting plants with roots projecting through holes, and a hydroponic solution feeding mechanism comprising a spraying mechanism for supplying a hydroponic solution onto the roots of the plants and a pumping means for supplying the hydroponic solution to the hydroponic solution spraying mechanism, the system further comprising canopies for connecting top edges of the angle panels of adjacent rows, thereby forming substantially triangular-sectioned spaces between adjacent angle panels, lighting apparatus for irradiating the plants supported on the angle panels and exhaust ports, both disposed on a lower surface of the canopies.

The angle panel used in the present invention can be any type of convex-sectioned panel such as that having an angular cross section, an arch cross section, or a trapezoidal cross section.

BRIEF DESCRIPTION OF THE DRAWINGS

FIG. 9B is a schematic view of the third embodiment of the hydroponic system according to the present invention.

DETAILED DESCRIPTION OF THE INVENTION

Preferred embodiments of the present invention when applied to a hydroponic culture system will be described with reference to the drawings.

Figure 1:
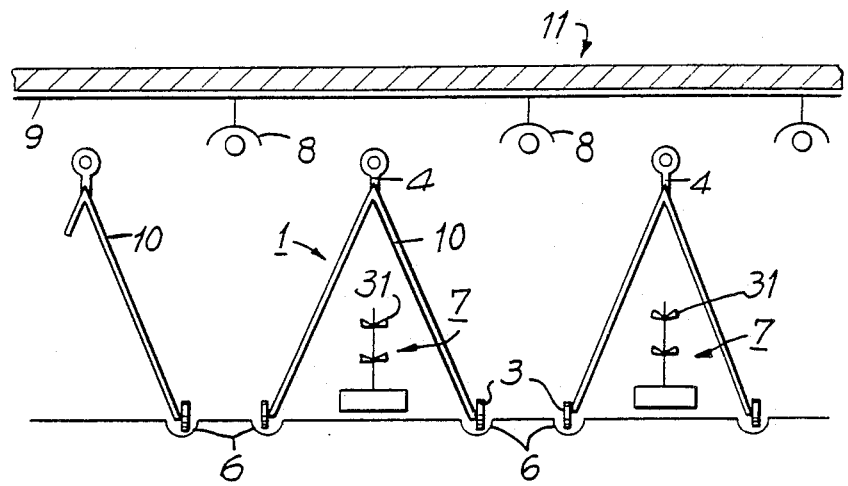
FIG. 1 and FIG. 2 are schematic views showing a first embodiment of the hydroponic culture system according to the present invention.
Figure 2:
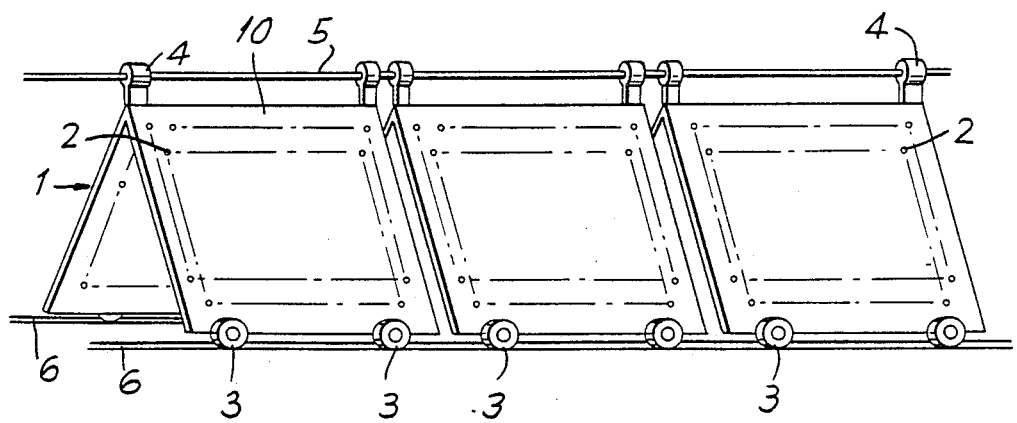

A first embodiment of the present invention will now be described with reference to FIG. 1 through FIG. 5. FIG. 1 and FIG. 2 are schematic views showing the structure of the first embodiment. Referring to the figures, angle panels 1 have a number of holes 2 which support young plants with their roots hanging down inside the angle panels. Wheels 3 are provided under the angle panels to allow movement of the panels. The angle panels 1 are made of foamed synthetic resins such as foamed polystyrene and earthenware material. As shown in FIG. 2, a plurality of the angle panels 1 are disposed in rows, to be movable in the longitudinal direction of the row. In this embodiment there are provided grooves 6 which guide the wheels 3. For increased stability, a supporting bar 5 penetrating supporting members 4 is disposed at the top of the angle panels 1; however, such a guiding mechanism for the angle panels is not always necessary. The angle panels 1 are disposed in a plurality of rows as shown in FIG. 1.

Figure 3:
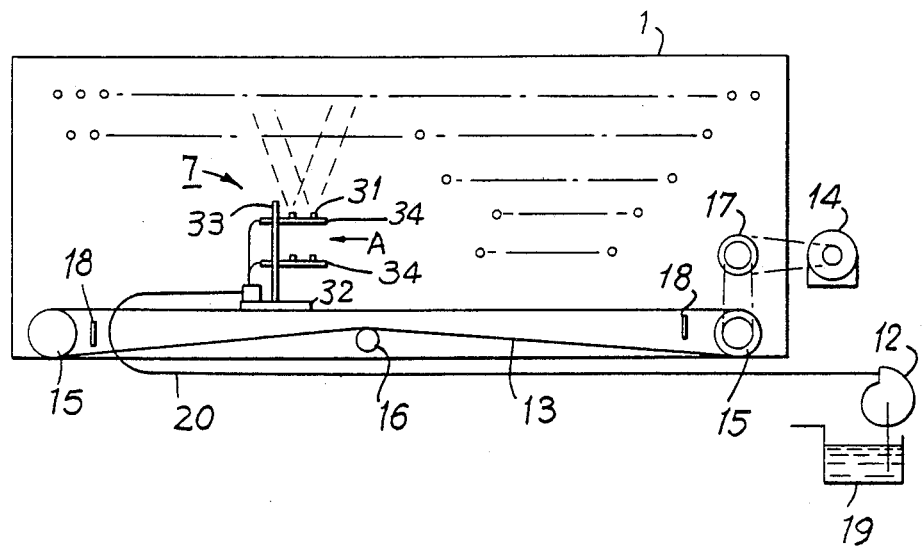
FIG. 3 is a schematic view showing a hydroponic feeding mechanism and a hydroponic solution spraying mechanism driving means for the first embodiment according to the present invention.
Figure 4:
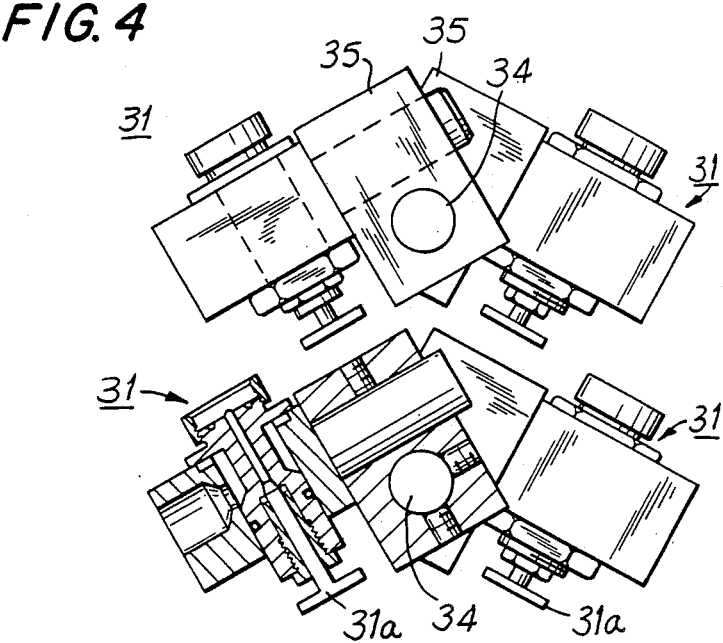
FIG. 4 is a schematic sectional view taken along the arrow in FIG. 3.

Next, a hydroponic solution feeding mechanism and a hydroponic solution spraying mechanism driving means for this embodiment will now be described. Referring to FIG. 3, the mechanism of this embodiment has a hydroponic solution spraying mechanism 7 and a pumping mechanism consisting of a flexible hose 20 and a hydroponic solution feed pump 12. In this case, the spraying mechanism 7, which is provided with four spray nozzles 31, is located inside the angle panels and is movable in the longitudinal direction of the angle panels 1. The spraying mechanism 7 is connected to the feed pump 12 with the flexible hose 20. The spraying mechanism 7 has a base plate 32, a stand rod 33 disposed standing on the base plate 32, and two rods 34 fixed perpendicularly to the stand rod 33, and the spray nozzles 31 are disposed on the rods 34. As shown in FIG. 4 showing a sectional view along arrow A, these spray nozzles 31 are disposed symmetrically about the longitudinal direction of the angle panels 1. Specifically, the spray nozzles 31 are disposed on the rods 34 through blocks 35 so that the spraying angle can be flexibly adjusted. Further, the spray nozzles 31 have adjusting screws 31a which can be turned to adjust the amount of hydroponic solution to be sprayed.

The driving means for the spraying mechanism consists of endless driving chains 13 and a drive motor 14 to drive the chain 13. The spraying mechanism 7 is placed on two endless driving chains 13 which are supported by two rolls 15 and an auxiliary rolls 16. The endless driving chains 13 are driven reciprocally or reversibly by the variable-speed, reversibly-controlled drive motor 14, which is switched to forward or reverse movement by detection switches 18 disposed at both ends.

The flexible hose 20 is contained in a bellows holder (not shown) disposed parallel to the endless driving chains. The hose can be bent only in a vertical plane parallel to the endless driving chains 13, but cannot be bent horizontally (in the direction perpendicular to the longitudinal direction of the angle panels 1), so that the flexible hose 20 does not obstruct the reciprocal movement of the hydroponic solution spraying mechanism 7.

To spray the hydroponic solution onto the plants, the feed pump 12 is operated to pump the hydroponic solution in a hydroponic solution tank 19. To being spraying from the spray nozzles 31 the drive motor 14 is operated to begin reciprocal movement of the hydroponic solution spraying mechanism 7. This provides uniform spraying of the hydroponic solution over the entire roots of the plants inside the panels. In this case, when both ends in the longitudinal direction of the angle panels 1 are closed, an almost closed spraying room is formed inside the angle panels 1, which is filled with hydroponic solution mist, thereby providing uniform spraying.

In this embodiment, the grooves 6 which guide the wheels 3 of the angle panels 1 can collect the hydroponic solution on the floor, thus providing a very improved economy for the apparatus.

All the angle panels 1 arranged in a plurality of rows, which are provided inside with the above-described hydroponic solution feeding mechanism, are disposed in a plant cultivation structure 11 which is shielded from sunlight. The wall material of the plant cultivation structure 11 is not specified, but can preferably be made of a heat insulating material; the ceiling is provided with lighting apparatus 8 to supply the plant with a constant intensity of light. The lighting apparatus can be a sodium lamp or a mercury lamp. Since this embodiment cultivates the plants only using an artificial light, plants of uniform quality can be systematically cultivated. In such an arrangement, light from the lighting apparatus 8 must he efficiently utilized to reduce the number of the lighting apparatus 8 for reduced power consumption and improved economy. In this embodiment, a reflector 9 is disposed on the ceiling and a reflector 10 on the surface of the angle panel 1 to reflect light from the lighting apparatus 8 to the plants, thereby considerably improving the economy. The reflectors 9 and 10 can be made of any reflective material such as stainless steel plate or aluminum foil. The angle panels 1 can also be made of a reflective material such as stainless steel plate.

This embodiment uses an environment control means to control the temperature, humidity and carbon dioxide concentration in the plant cultivation structure 11. A preferred example of the environment control means will be described in detail later in another embodiment.

The functions and operation of the first embodiment of the present invention with the above-described arrangement will now be described. Young plants of a green vegetable such as lettuce, Brassica Rapa var. pervidis, chrysanthemum coronarium, spinach, or honewort are inserted into holes 2 of the angle panels 1. The plants are irradiated with a specified intensity of light from the lighting apparatus 8, and sprayed with a specified amount of hydroponic solution from the hydroponic solution spraying mechanism 7. The hydroponic solution is sprayed while the spraying mechanism is moved reciprocally in the longitudinal direction of the panels by the operation of the drive motor 14, thus spraying the hydroponic solution evenly over the entire root parts of the plants inside the panels.

By the above-described operation, the young plants are systematically grown to almost uniform sizes and harvested. Since the angle panels 1 are disposed in rows, and are movable and detachable, the angle panels 1 with new young plants are inserted from one end of the row, for example, and moved successively in a direction; also grown plants can be taken out together with the angle panels 1, thereby considerably improving the working efficiency. Thus, when the plants are to he grown for 20 days up to the harvest, and 20 angle panels 1 are arranged in a row and are moved by the length of a single panel per day, it takes 20 days from the insertion of an angle panel 1 into one end of a row until it comes out of the other end, and the plants on that angle panel 1 are sufficiently grown during the period. In this case, the angle panels 1 can be moved manually, or with a drive unit when an increased number of angle panels are used. In addition to the improvement in the working efficiency, by moving the angle panels 1, the lighting conditions (amount and direction) and the hydroponic solution feeding conditions can be maintained consistently.

Figure 5:
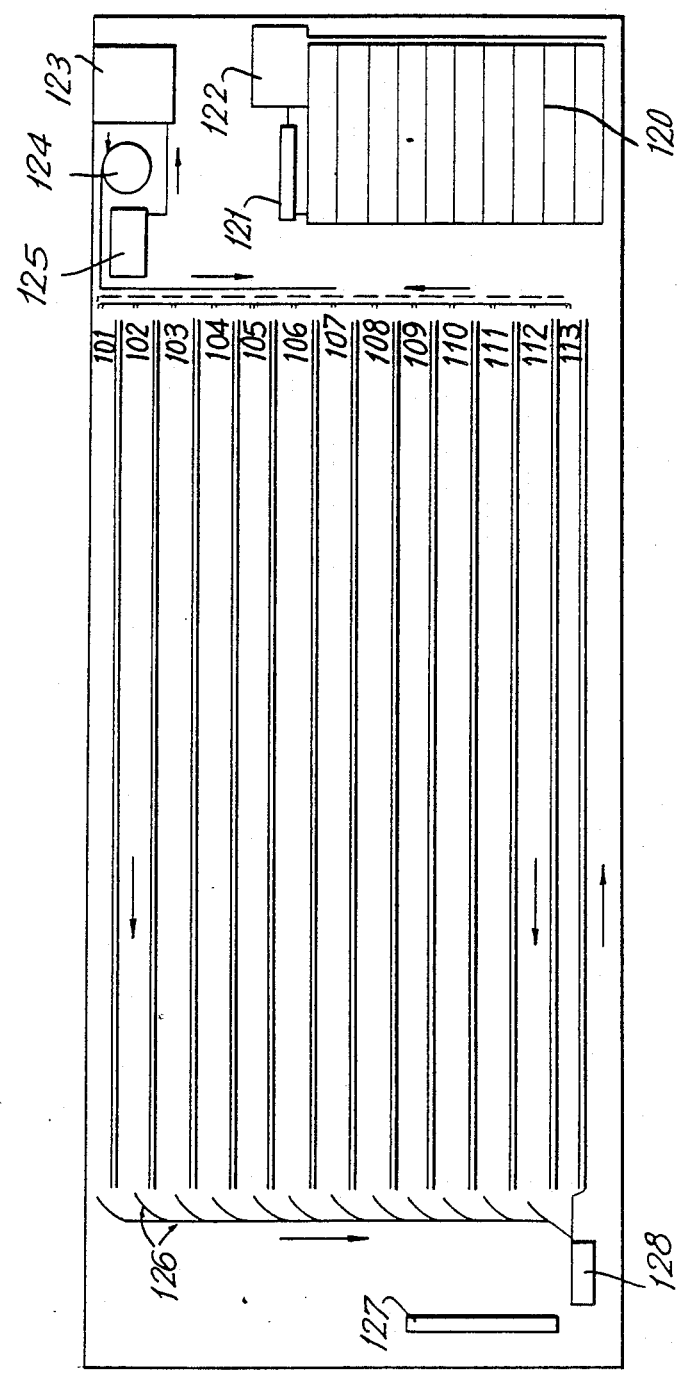
FIG. 5 is a schematic view showing a hydroponic cultivation factory using the first embodiment of the hydroponic culture system according to the present invention.

FIG. 5 is a schematic view showing a hydroponic cultivation factory using the above-described hydroponic culture system. This factory has a structure to block sunlight, and is provided with lighting apparatus in the factory As shown in the figure, the factory has 12 rows of the angle panels 1, from 101 to 112, which can be moved to the left in the figure. The factory also has seedling culture rooms 120 to prepare the young plants to be inserted into the holes 2 of the angle panels 1, a hydroponic solution sterilizer tank 121 and an underground tank 122. Further, the above-described hydroponic feeding mechanism is connected to a hydroponic solution sterilizer tank 125, a pressure tank 124, and an underground storage tank 123, all being separately disposed. The hydroponic solution is periodically sprayed from the spray nozzles 31 of the spraying mechanism 7, and the hydroponic solution sprayed and accumulated on the floor is collected through the groove 6 shown in FIG. 1. In the factory with such an arrangement, young plants prepared in the seedling culture rooms 120 are inserted in the holes 2 of the angle panels 1, which are then mounted on the right side of a row of the angle panels 1, at the right side in the figure. The young plants, being periodically moved with the angle panels 1 to the left in the figure, absorb carbon dioxide and oxygen in the atmosphere while being provided with the hydroponic solution and artificial light. In this case, the carbon dioxide can be supplied during the lighting period at which the artificial light is applied to activate the photosynthesis.

The operation of the factory is scheduled so that the plants are sufficiently grown when they reach the left end of the row. The thus grown plants are removed with the angle panels 1 from the row and collected via a panel conveyor 126 to a panel storage 128, where the plants are harvested, selected through a selection conveyor, and automatically packaged for shipment. The empty angle panels are fed by a return conveyor to the right in the figure for use with new young plants.

As described above, with the hydroponic culture system according to the invention, the insertion and harvesting can be carried out at both ends of the factory (right and left sides in the figure) with a very high efficiency. This arrangement also enables periodical and systematic shipment of the plants.

In the above-described first embodiment of the present invention, the angle panels 1 are disposed movably and detachably in straight lines, thereby considerably improving the working efficiency of the insertion and harvest of the plants. Moreover, moving the angle panels 1 periodically in a direction provides almost constant lighting conditions and systematic harvest of uniformly grown plants. In using the artificial light together with reflecting surfaces on the ceiling, walls, and floor of the plant cultivation structure for effective utilization of the light, the number of the lighting devices can be reduced, resulting in a reduction in power cost and a considerable improvement in economy.

A variety of structures can be considered for the hydroponic solution spraying mechanism 7, and any structure can be used that allows uniform spraying of the hydroponic solution over the entire plants according to the size and configuration of the angle panels 1.

Furthermore, the hydroponic solution spraying mechanism driving means and the pumping mechanism are in no way limited to those described above; a variety of other configurations can also be used.

Figure 6:
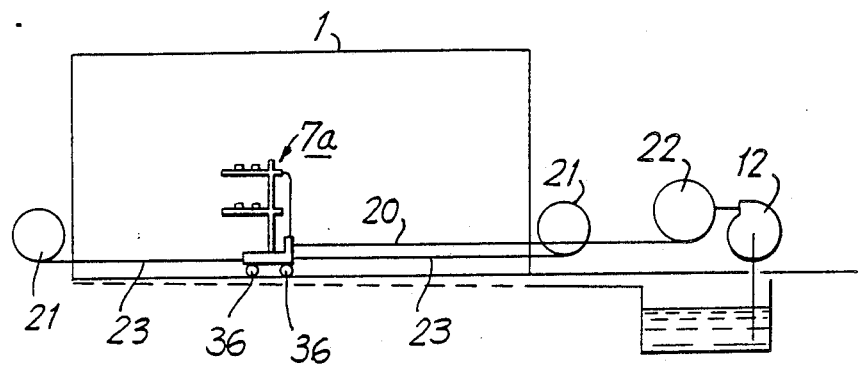
FIG. 6 and FIG. 7 are schematic views showing a hydroponic solution feeding mechanism and a hydroponic solution spraying mechanism of a second embodiment of the hydroponic culture system according to the present invention.
Figure 7:
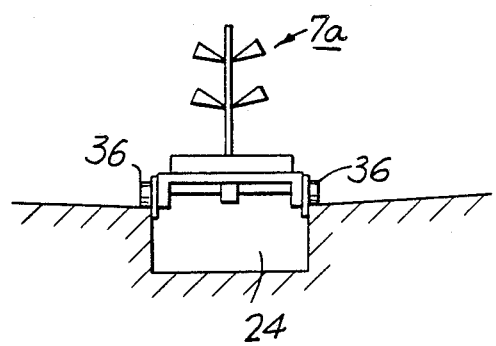
Figure 8:
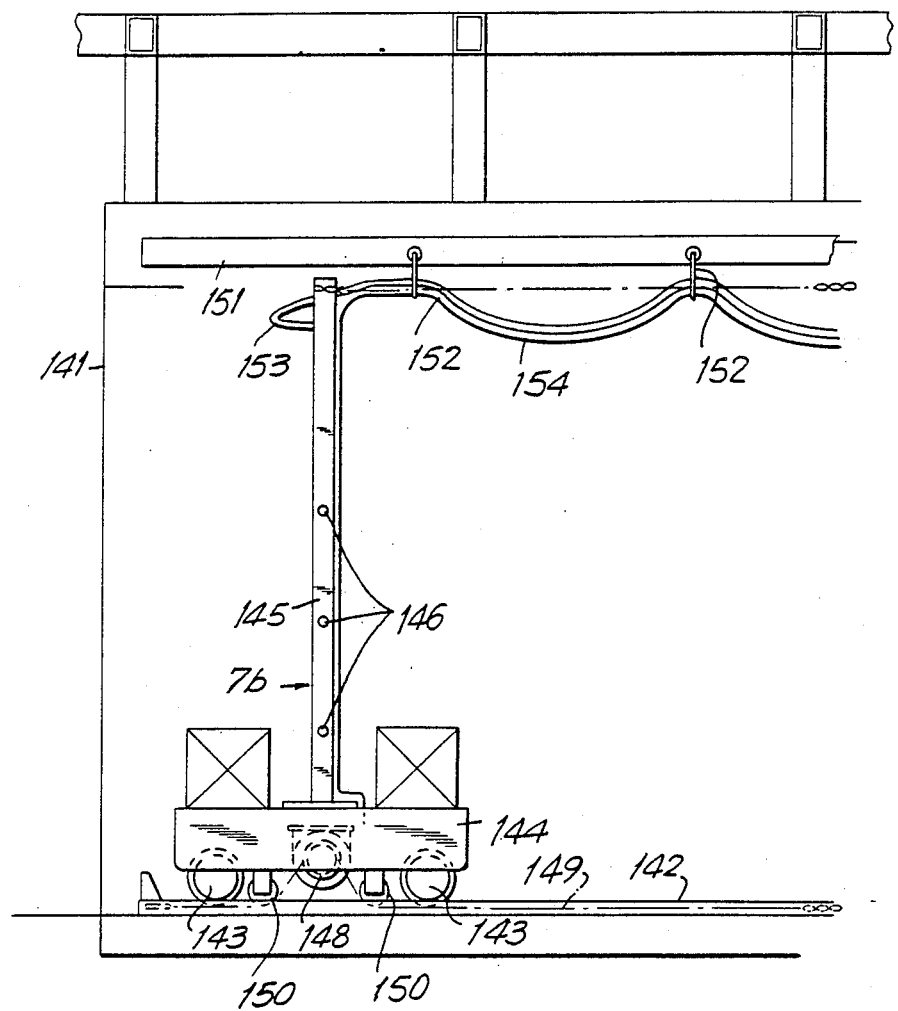
FIG. 8 and FIG. 9 are a front view and a side view, respectively, of a hydroponic solution spraying mechanism of a third embodiment of the hydroponic culture system according to the present invention.

A second embodiment of the present invention will now be described with reference to FIG. 6 and FIG. 7. Referring to both figures, in this hydroponic solution spraying mechanism driving means, a spraying mechanism 7a having moving rollers 36 is reciprocally moved by winding a rope 23, attached to the front and rear ends in the moving direction, with a variable-speed, reversibly-controlled rope winding unit 21. In this case, the flexible hose 20 connecting the hydroponic solution feeding pump 12 and the hydroponic solution spraying mechanism 7a is wound with a hose winding unit 22 which prevents slack in the flexible hose 20 so that it does not obstruct the reciprocal movement of the spraying mechanism 7a. A hydroponic solution collection groove 24 is disposed along the route of reciprocal movement of the spraying mechanism 7a.

A third embodiment of the present invention will be described, with reference to FIG. 8 through FIG. 11. Referring to the figures, rails 142 are disposed on the floor inside an angle panel 141, along the longitudinal direction of the angle panel 141, and a hydroponic solution spraying mechanism 7b with a self-propelling means is disposed on the rails 142.

The spraying mechanism 7b consists of a base plate 144 with wheels 143 placed on the rails 142, a stand 145 provided on the base plate 144, and spray nozzles 146 attached on both sides to the stand 145. The base plate 144 also has a variable-speed, reversible drive motor 147. A sprocket 148 is mounted on the rotary shaft of the drive motor 147, and the upper surface of the sprocket 148 is in engagement with a chain 149 which is disposed along the longitudinal direction of the angle panel 141, thus providing the self-propelling means. The chain 149, with both ends fixed, can be lifted up only at the part engaging with the sprocket 148. Auxiliary sprockets 150 are disposed at the front and rear sides of the sprocket 148 to prevent excessive lifting of the chair 149.

Figure 10:
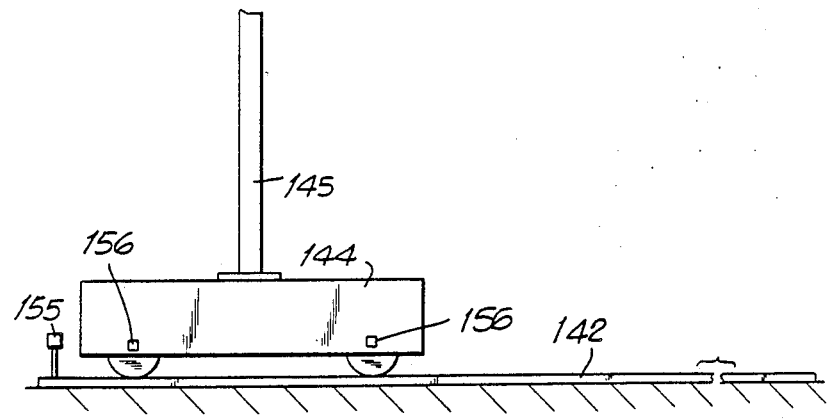
FIG. 10 and FIG. 11 are a front view and a side view, respectively, of a position detecting means of the second embodiment according to the present invention.
Figure 11:
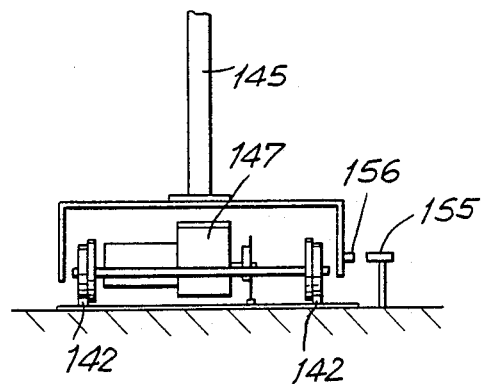
Figure 12:
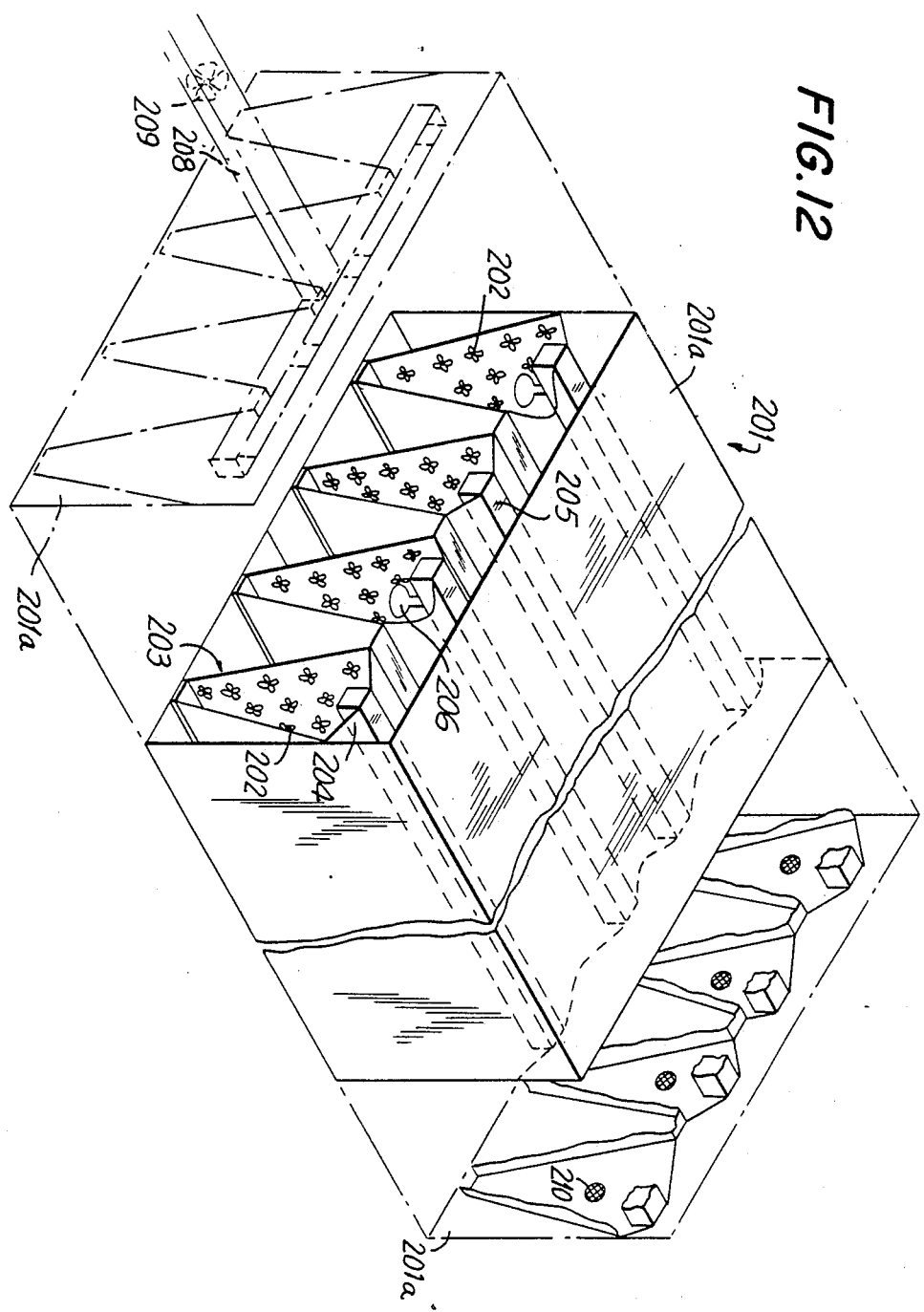
FIG. 12, FIG. 13 and FIG. 14 are schematic views showing a fourth embodiment of the hydroponic culture system according to the present invention.
Figure 13:
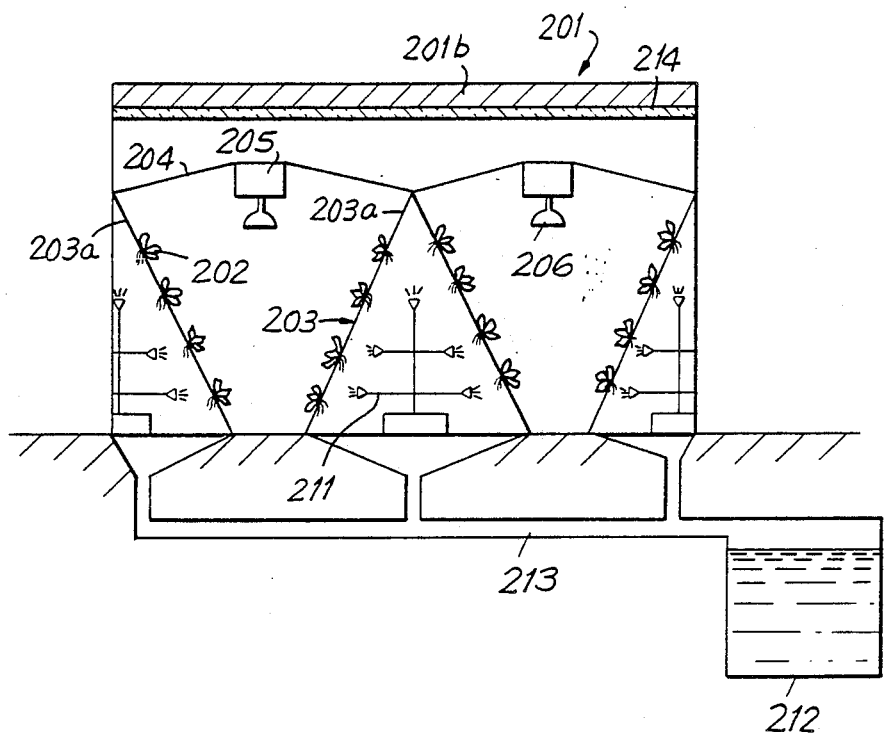
Figure 14:
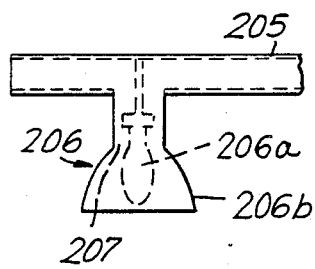

A hanger rail 151 is provided at the top of the angle panel 141, along the longitudinal direction of the angle panel 141. The hanger rail 151 has, hung thereon, a flexible hose 153 and a power cord 154, through hanger rolls 152. One end of the flexible hose 153 is connected to spray nozzles 146 through the stand 145, and the power cord 154 is connected to the drive motor 147. There are provided a plurality of hanger rolls 152 with adequate spacings, which guide the flexible hose 153 and the power cord 154 along the hanger rail 151 according to the movement of the hydroponic solution spring mechanism 7b. The other end of the flexible hose 153 is connected to a hydroponic solution feeding pump, which is not shown, so that the hydroponic solution is fed to the spray nozzles 146 through the hose 153. The other end of the power cord 154 is connected to a power supply, which is not shown, and the movement of the spraying mechanism 7b is controlled by signals from position detecting means provided at both ends of the rails 142. Thus, as shown in FIG. 10 and FIG. 11, there are provided proximity switches 155 which sense metals at both ends of the rails 142, and a proximity switch striker 156 made of a metal at the side of the base plate 144. When the spraying mechanism 7b is detected at one end of the rails 142 by one of the proximity switches 155, the phase of the alternating current supplied to the drive motor 147 is switched to reverse the rotation of the drive motor 147, thereby reciprocally moving the spraying mechanism 7b. The proximity switches 155 used in this embodiment are resistant to water and therefore preferable for use as the position detecting means, however, this apparatus is in no way limited to such proximity switches, and other types such as limit switches or photoelectric tubes can be used.

The third embodiment of the hydroponic culture system with the above-described arrangement according to the present invention is used as follows. Young plants such as of lettuce are inserted into the plurality of holes provided in the angle panel 141, and irradiated with light from the lighting apparatus (not shown). Then the drive motor 147 is energized to rotate the sprocket 148, which engaged with the chain 149 to move the base plate 144 along the rails 142. When the base plate 144 reaches one end of the rails 142 and is detected by the proximity switch 155, the drive motor 147 is rotated in reverse to move the base plate 144 reciprocally. At the same time, the hydroponic solution is sprayed from the spray nozzles 146 evenly over the roots of the plants. The flexible hose 153 and the power cord 154 are automatically extended and contracted according to the movement of the base plate 144 by the function of the hanger roll 152, thus preventing obstruction to the reciprocal movement of the base plate 144.

Figure 9:
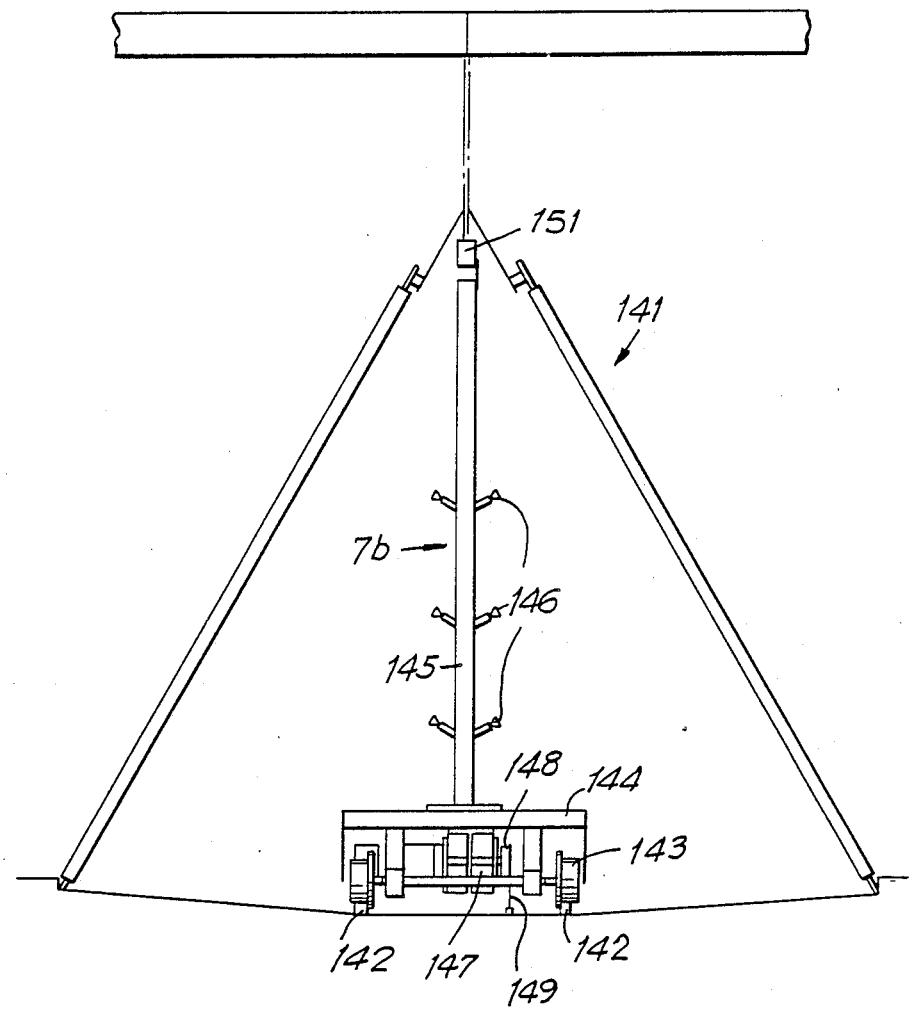
Figure 9A:
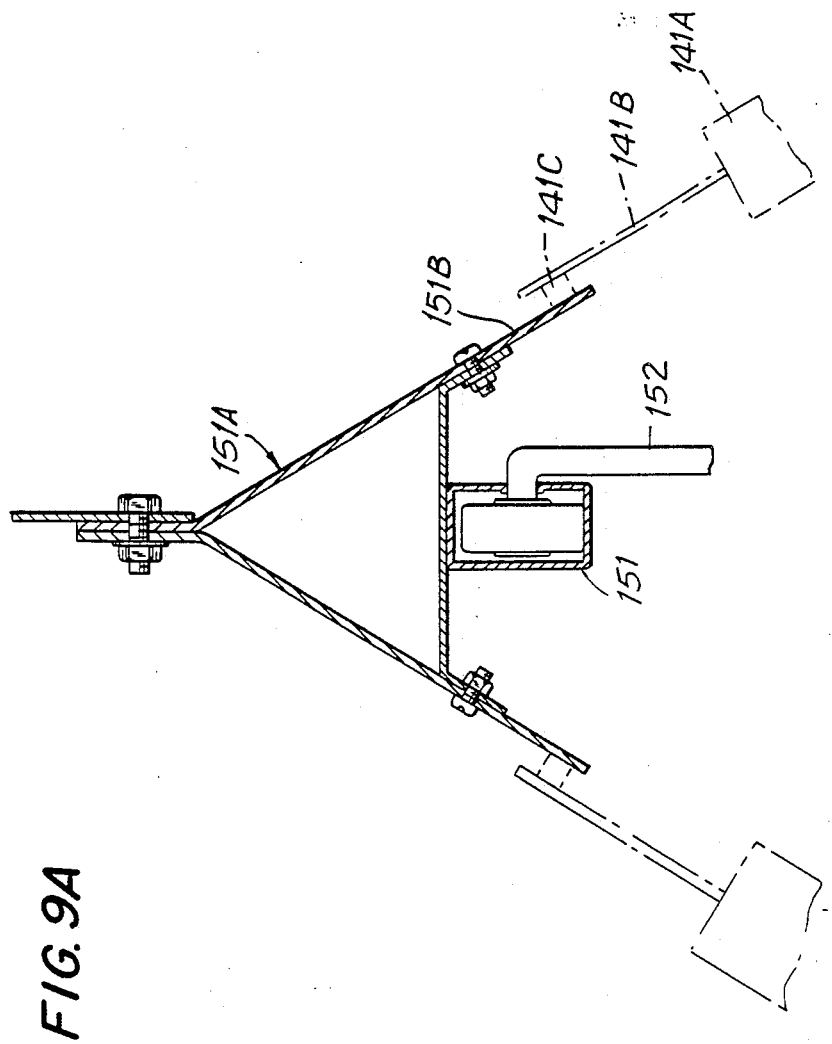
FIG. 9A is a detailed front view of the upper portion of a panel assembly and its supporting means.

Referring to FIG. 9A and FIG. 9B, the hanger rail 151 is affixed to the underside of a supporting fixed member 151A, and this fixed member 151A extends in the longitudinal direction of the angle panel assemblys' 141. The fixed member 151A, which has an inverted Y-formed cross section, is fixed to the ceiling, and the panels 141A themselves are detachably supported by a panel supporting portion 151B open at both panel sides. Thus, the panels 141A slidably lean at their upper ends against the panel supporting portions 151B of the fixed member 151A, and the two panels 141A form an angle panel assembly 141.

Affixed to the top edge of each panel 141A is a rail supporting member 141B, and its inner side is provided with a rail 141C which slides on panel supporting portion 151B. At the bottom edge of the panels 141A are affixed wheels 141D for smooth movement of the panel assemblys' 141.

Each individual panel 141A is a single integral panel extending from its top edge where it is attached to the rail supporting member 141B to its bottom edge which is supported by its wheels 141D. Supporting fixed member 151A and wheel 141D comprise transport means for the individual panels 141A.

The self-propelling means in this embodiment consists of the drive motor 147, the sprocket 148, and the chain 149. Since the chain 149 is disposed only one on the floor, there is no difficulty in adjusting the tension of the chain 149, and since there are also provided the auxiliary sprockets 150, the chain 149 and the sprocket 148 will not disengage. The self-propelling means is in no way limited to the type as described above; any types may be used that positively move the hydroponic solution spraying mechanism 7b in reciprocal movement.

A fourth embodiment of the present invention will be described with reference to FIGS. 12 through 16. Referring to the figures, there are provided angle panels 203 in a plant cultivation structure 201, each consisting of two panels 203a with the top edges joined, arranged in a plurality of rows, and having a number of holes to support plants 202 where the roots are projected inside the panels 203a. Both ends of the rows of the angle panels 203 are connected to side walls 201a. Top edges of the adjacent angle panels 203 are connected with canopies 204 having an angular cross section to prevent diffusion of light to the upper side, forming nearly triangular-sectioned spaces surrounded by the adjacent angle panels 203 and the canopies 204. An exhaust duct 205 as an exhaust means is provided at the center of the canopy 204, and lighting apparatus 206 are disposed under the exhaust duct 205, which are arranged with nearly equal spacings along the longitudinal direction of the angle panels 203.

The angle panels 203 can be made of foamed polystyrene, stainless steel, reinforced plastics, or ceramics, and have an inclination angle of 40 to 70 degrees preferably 60 degrees, from the horizontal plane in view of the cultivation and lighting efficiencies. The canopies 204 can also have another cross section, other than the angular cross section, such as an arc cross section that may provide concentration of heat to a limited position under the canopies and improved exhaust efficiency, and preferably be made of a heat-insulating material such as foamed polystyrene, or the heat-insulated material bonded with a reflecting material such as stainless steel plate or aluminum foil.

Figure 15:
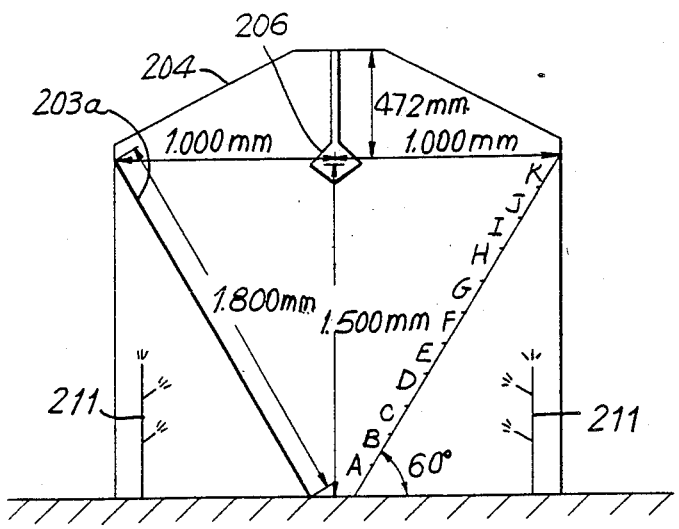
FIG. 15 and FIG. 16 are schematic views showing test examples in the fourth embodiment according to the present invention.
Figure 16:
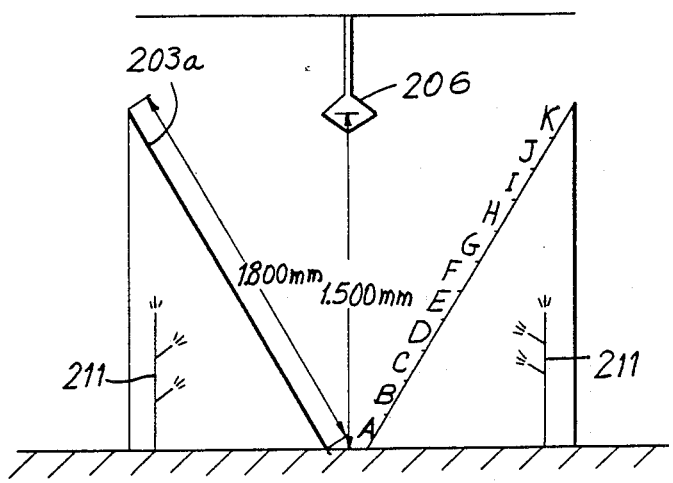

The lighting apparatus 206 consists of a lamp 206a such as a sodium lamp or mercury lamp and a cover 206b, and an exhaust port 207 communicating with the Test systems used are shown in FIG. 15 and FIG. 16, of which the components are indicated with the same numerals as used in the above-described embodiment with the description omitted. The lower surfaces of the canopy 204 in FIG. 15 and the ceiling in FIG. 5 are provided with reflecting surfaces. A 940W reflector-type high-pressure sodium lamp with a total light flux of 110,000 lumina is used for the lighting apparatus 206.

The cultivation conditions include a daytime of 18 hours, a day temperature of 24 degrees C., a night temperature of 18 degrees C., and a carbon dioxide concentration of 1,500 ppm. Young plants of lettuce of 20 days after seeding (with 4 to 5 leaves, about 10 g weight) are planted at positions A to K, and the weights of the individual plants are compared after a cultivation of 10 days. The result is shown in the Table below.

| Position | | A | B | C | D | E | F | G | H | I | J | K | Av. |
|---|---|---|---|---|---|---|---|---|---|---|---|---|---|
| Closed lighting | Illuminance ($\times$ 10,000 lux) | 1.8 | 2.0 | 2.1 | 2.3 | 2.4 | 2.6 | 2.6 | 2.5 | 2.3 | 2.1 | 1.9 | 2.2 |
| | Plant weight (g) | 83 | 89 | 93 | 86 | 117 | 93 | 117 | 122 | 100 | 88 | 81 | 97 |
| Open lighting | Illuminance ($\times$ 10,000 lux) | 1.4 | 1.6 | 1.7 | 2.0 | 2.3 | 2.6 | 2.5 | 2.4 | 2.2 | 2.0 | 1.7 | 2.0 |
| | Plant weight (g) | 36 | 62 | 78 | 84 | 88 | 110 | 114 | 108 | 90 | 84 | 74 | 84 | exhaust duct 205 is formed between the lamp 206a and the cover 206b. The cover 206b is to prevent diffusion of the radiation heat of the lamp 206a, and can be made of a transparent material. The exhaust duct 205 communicates with a duct 208 outside the plant cultivation structure 201, and heat in the cultivation space is exhausted by a ventilation fan 209 disposed in the duct 208. The side wall 201a of the plant cultivation structure 201 is provided with an air supply port 210. The air supply port 210 is to introduce the outside air, and can also be connected to an air-conditioning unit to supply cold air to the cultivation space or carbon dioxide when such is in short supply. The duct 208 and the air supply port 210 can also be connected to the same air-conditioning unit to recirculate the air. In this case, it is sufficient to replenish the amount of carbon dioxide absorbed by the plant 202, thus providing improved economy. Although it is preferable that the side wall 201a is provided with the air supply port 210, both ends of the rows of the angle panels 213 can be opened instead.

There is provided a hydroponic solution spraying mechanism 211 inside the angle panels 203, to feed the hydroponic solution or the like to the roots of the plants 202. The spraying mechanism 211 is connected to a pump (not shown) with a polyvinyl chloride pipe to pump the hydroponic solution stored in a hydroponic solution tank 212 which is disposed underground outside the plant cultivation structure. The pump and the polyvinyl chloride pipe form a hydroponic pumping mechanism of this embodiment.

The spraying mechanism 211 can be as shown in the first to third embodiments described above. In this embodiment, the hydroponic solution sprayed and accumulated on the floor is collected through a collection passage 213. The inner surface of a ceiling 201b of the plant cultivation structure 201 is provided with a heat-insulating material 214.

In this arrangement of the hydroponic culture system, the surface of the angle panels 203 can also be provided with a reflecting surface in addition to the lower surface of the canopy 204 for further improved lighting efficiency.

A closed-type lighting and an open-type lighting in the fourth embodiment are compared. The closed-type lighting indicates one which uses the hydroponic culture system having the canopies in this embodiment.

As shown in the Table, the closed-type lighting provides a higher illuminance on the panel surface than the open-type lighting, and a higher growth rate, resulting in a greater plant weight.

Figure 17:
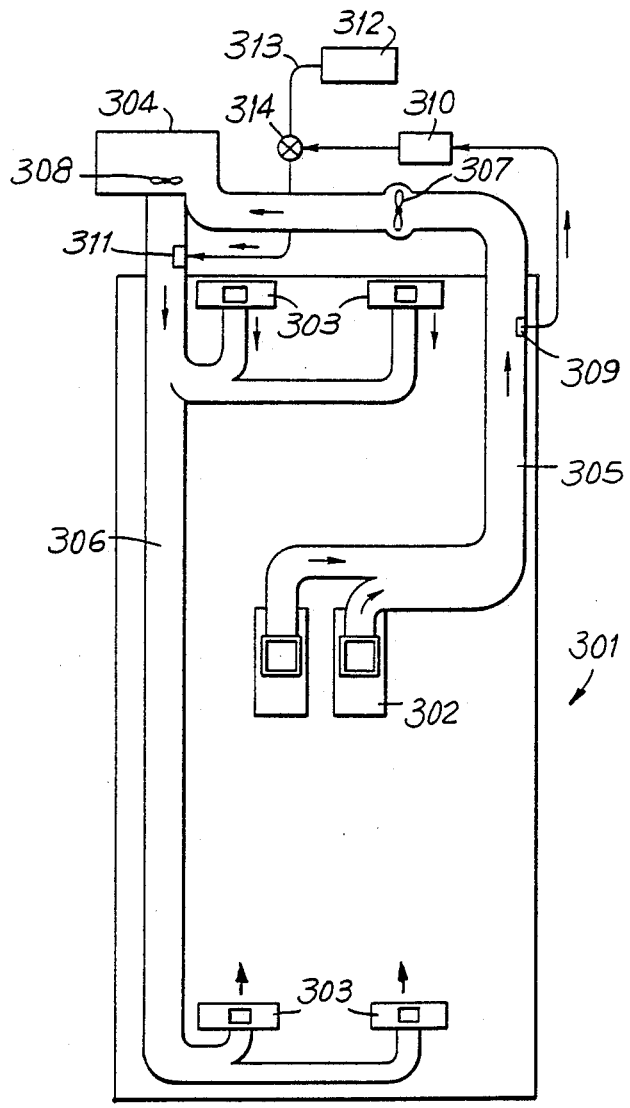
FIG. 17 through FIG. 19 are schematic views showing an environment control means of a plant cultivation structure using a fifth embodiment of the hydroponic culture system according to the present invention.

A fifth embodiment of the hydroponic culture system according to the present invention will be described with reference to FIGS. 17 through 19. In this embodiment, a preferred environment control means for the hydroponic culture system is described. Referring to the schematic view in FIG. 17, a plant cultivation structure 301 has an exhaust port 302 and an air supply port 303, which are connected to an air-conditioning unit 304 disposed outside through an exhaust duct 305 and an air supply duct 306, respectively. With such an arrangement, air in the plant cultivation structure 301 is fed by a suction fan 307 disposed in the exhaust duct 305, through the exhaust duct 305 to the air-conditioning unit 304, where the air is conditioned (cooled or heated). The conditioned air is returned by a blowing fan 308 through the air supply duct 306 to the plant cultivation structure 301. In this embodiment, there is provided a carbon dioxide sensor 309 such as a carbon dioxide concentration measuring device in the exhaust duct 305, which takes in a sample to be measured for the concentration of carbon dioxide and outputs an electrical signal according to the measured carbon dioxide concentration of the sample to a carbon dioxide controller 310 as a control means. A carbon dioxide outlet port 311 is provided in the vicinity of the connection of the air supply duct 306 to the air-conditioning unit 304. The carbon dioxide outlet port 311 is connected to a carbon dioxide cylinder 312 as a carbon dioxide supply source through a feed pipe 313 as a feed passage, and an electromagnetic valve 314 is disposed in the middle of the feed pipe 313. The carbon dioxide controller 310 has a function as a control means to control the electromagnetic valve 314 according to the electrical signal transmitted from the carbon dioxide sensor 309. Thus, the carbon dioxide controller 310 compares the value of the electrical signal transmitted from the carbon dioxide sensor 309 and an electrical signal value corresponding to a predetermined carbon dioxide concentration and opens the electromagnetic valve 314 for a predetermined period of time according to the difference between the above signals to feed a predetermined amount of carbon dioxide into the air supply duct 306. Amounts of carbon dioxide to be fed relative to the difference in the electrical signals between the measured value and the setting value are previously determined through a test operation and set in to the carbon dioxide controller 310.

Since, in this embodiment, air is exhausted from the plant cultivation structure 301 through the exhaust port 302 and fed through the air supply port 303, it is circulated at a substantial speed in the plant cultivation structure. In this embodiment, the exhaust port 302 is disposed on the ceiling at the center of the plant cultivation structure 301 and the air supply ports 303 are disposed at both sides of the plant cultivation structure 301, thereby providing a high recirculation efficiency. By sampling air in the exhaust duct 305 for measuring the carbon dioxide concentration in the plant cultivation structure 301, a measured value which reflects the entire plant cultivation structure 301 can be obtained. This leads to a proper supply of carbon dioxide according to the measured concentration of carbon dioxide. Since the carbon dioxide is not directly supplied into the plant cultivation structure 301 but is supplied from the carbon dioxide outlet 311 into the air supply duct 306, the supplied carbon dioxide is mixed with recirculating air and then fed into the plant cultivation structure 301. Therefore, there will not occur an uneven distribution of carbon dioxide concentration in the plant cultivation structure 301.

Figure 18:
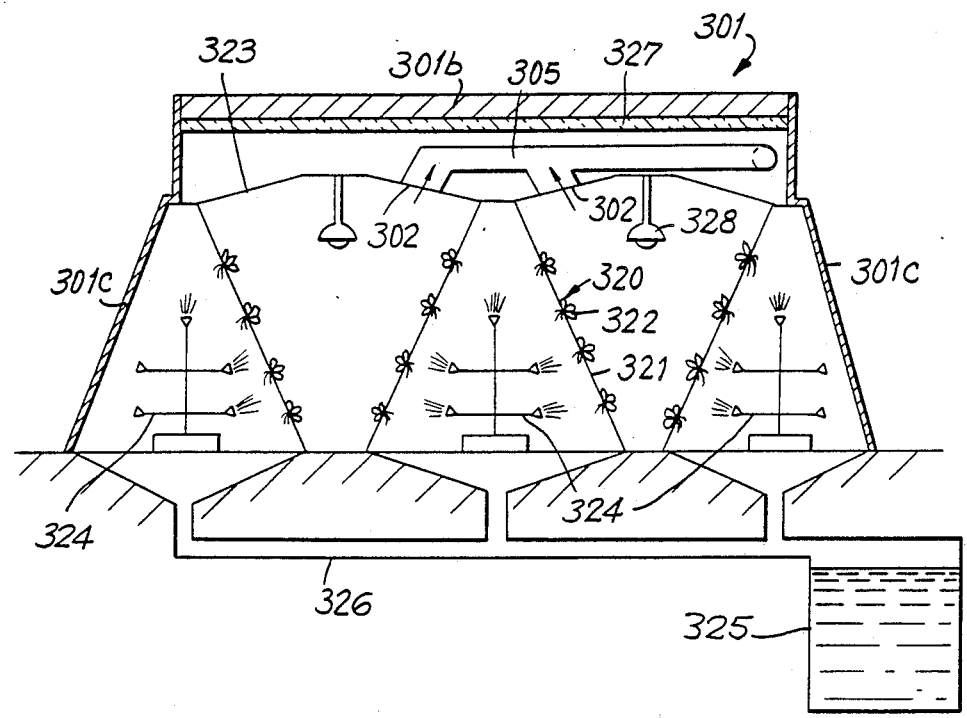
Figure 19:
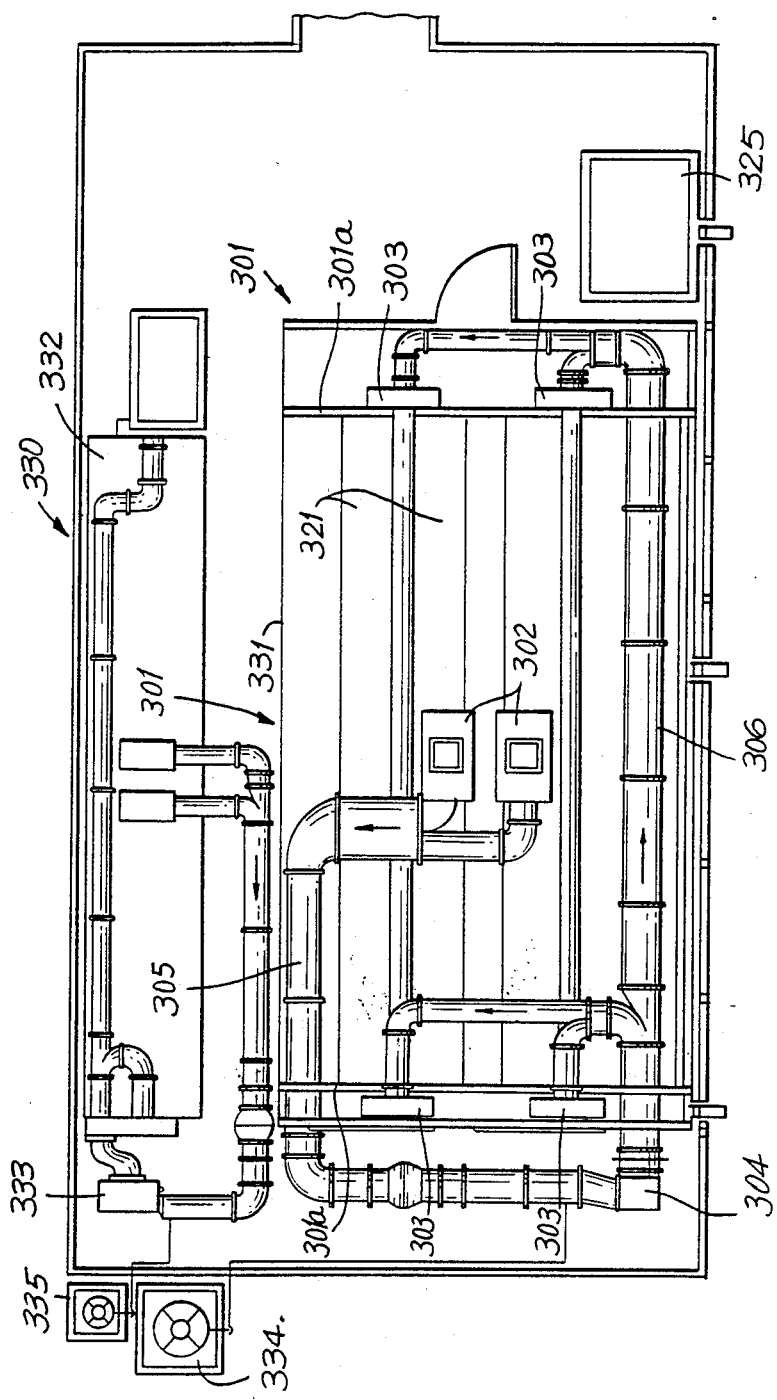
Figure 20:
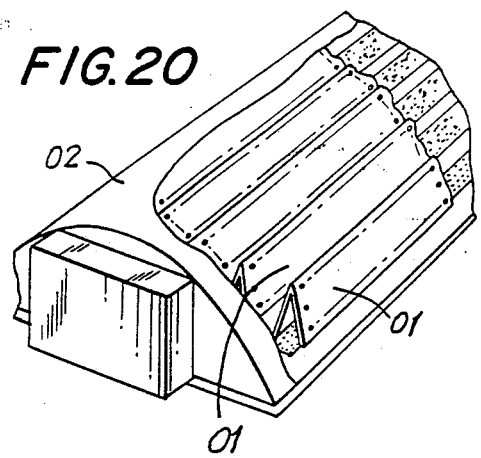
FIG. 20 through FIG. 22 are schematic views showing a hydroponic culture system according to the conventional art.
Figure 21:
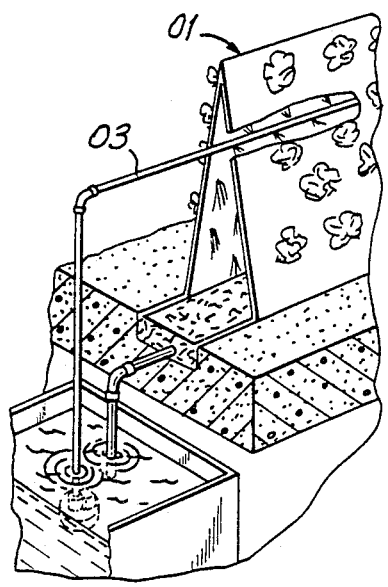
Figure 22:
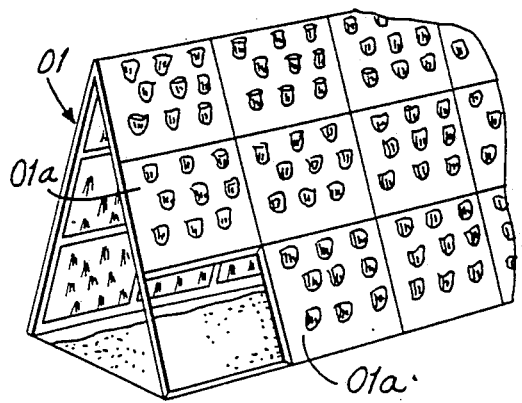

There are provided in the plant cultivation structure 301, as shown in FIG. 18 and FIG. 19 for example, angle panels 320 arranged in a plurality of rows (three rows in the figures), each consisting of two panels 321 with the top edges joined, having a number of holes to support plants 322 of which the roots are projected inside the panels 321. Both ends of the rows are connected to side walls 301a, and both sides are closed with side walls 301c. Top edges of the adjacent angle panels 320 are connected with canopies 323 having an angular cross section to prevent diffusion of light to the upper side, forming nearly triangular-sectioned spaces surrounded by the adjacent angle panels 320 and the canopies 323. An exhaust duct 302 as an exhaust means is provided at the center of the canopy 323, and lighting apparatus 328 are disposed under the canopy 323 and arranged with nearly equal spacing along the longitudinal direction of the angle panels 320. There is provided a spraying mechanism 324 inside the angle panels 320, as a hydroponic solution feeding mechanism to feed the hydroponic solution or the like to the roots of the plants 322. The spraying mechanism 324 is connected to a pump (not shown) with a polyvinyl chloride pipe to pump the hydroponic solution stored in a tank 325 which is disposed underground outside the plant cultivation structure. The spraying mechanism 324 can he as used in the first to third embodiments described above.

The hydroponic solution sprayed and accumulated on the floor is collected through a collection passage 326. The inner surface of a ceiling 301b of the plant cultivation structure 301 is provided with a heat-insulating material 327. The air supply ports 303 are formed at both corners of the plant cultivation structure 301.

As shown in FIG. 19, there is provided a seedling culture line 332 in the plant cultivation factory 330, in addition to the above-described cultivation lines 331, and the seedling culture line 332 is also air-conditioned by an air-conditioning unit 333. Thus, the seedling culture line 332 can also be controlled for the carbon dioxide concentration as needed, as described above. There are provided cooling towers 334 and 335 for the air-conditioning units 304 and 333 outside the plant cultivation factory 330.

In the above-described plant cultivation structure 301, it is sufficient to control the carbon dioxide concentration only when the photosynthesis is actively carried out (when irradiated with the artificial light from the lighting apparatus), thus providing an improved economy.

Although, in this embodiment, the air supply port 309 is disposed in the exhaust duct 305 and the carbon dioxide outlet port 311 is in the air supply duct 306, these ports can also be disposed in reverse.

What is claimed is:

1. A hydroponic culture system having a plant cultivation room which is shielded from sunlight, comprising:
   a plurality of angle panels, arranged in a plurality of rows, having a longitudinal dimension,
   each of said angle panels comprising;
      two panels having their upper edges joined, each of said panels having a plurality of holes for supporting plants with their roots projecting through the bottom of said holes,
   feeding means, comprising;
      spraying means, for supplying a hydroponic solution onto the roots of said plants, being movable in the longitudinal direction
      pumping means for supplying said hydroponic solution to said spraying means,
   driving means, connected to said feeding means, for moving said spraying means in said longitudinal direction,
   canopy means for connecting said upper edges of said angle panels which are in adjacent said rows,
      thereby forming substantially triangular-sectioned spaced between adjacent said angle panels,
   lighting means, for irradiating said plants supported on said angle panels, and
   exhaust port means,
   said lighting means and said exhaust port means being arranged on a lower surface of said canopy means.

2. The hydroponic culture system as defined in claim 1, wherein said canopy means each have an arch or angular cross section.

3. The hydroponic culture system as defined in claim 1, wherein reflecting means are provided on said lower surfaces of said canopy means.

4. The hydroponic culture system as defined in claim 1, wherein said exhaust port means is disposed in the vicinity of said lighting means.

5. The hydroponic culture system as defined in claim 1, wherein said lighting means comprises a light source and a cover surrounding said light source, and said exhaust port means is arranged between said light source and said cover.

6. The hydroponic culture system as defined in claim 1, further comprising an environment control means for controlling the environment within said plant cultivation room, said environment control means comprising a measuring means for measuring the concentration of carbon dioxide in air sampled in a duct means for conducting air between a space defined by said plant cultivation room and an air-conditioning means, a carbon dioxide outlet port means and a carbon dioxide supply means and having a valve means, and a control means for controlling said valve means as a function of the concentration of carbon dioxide measured by said measuring means, whereby the concentration of carbon dioxide in said space defined by said plant cultivation room can be adjusted to a predetermined value.

7. The hydroponic culture system as defined in claim 1, wherein said spraying means is movable along the longitudinal direction of said angle panel, said system further comprising driving means for moving said spraying means along said longitudinal direction.

8. The hydroponic culture system as defined in claim 1, wherein said driving means comprises an endless driving chain, and said pumping means has a flexible hose connected to said spraying means for supplying said hydroponic solution thereto.

9. The hydroponic culture system as defined in claim 1, wherein said driving means are mounted on said spraying means, and wherein said system further comprises first and second position detecting means for detecting the position of said spraying means, said first position detecting means being disposed at both ends of the row of said angle panels and said second position detecting means being disposed on said spraying means.

10. The hydroponic culture system as defined in claim 1, wherein said spraying means comprises a base plate and a plurality of spray nozzles disposed on a stand mounted on said base plate, and said driving means comprises a drive motor disposed at a lower side of said base plate and a sprocket mounted on a rotary shaft of said drive motor, said sprocket engaging a chain disposed along the longitudinal direction of said angle panel.

11. A hydroponic culture system comprising:
a plurality of angle panels disposed in a plurality of rows, each row having individual angle panels disposed in series,
transport means for transporting each of said individual angle panels in a longitudinal direction, said transport means having an upper portion for supporting the upper end of said angle panel and a lower portion for supporting the lower end of said angle panel, said transport means allowing individual movement of said angle panels,
each of said individual angle panels arranged to be detachably removed from the transport means which carry it,
each of said individual panels having a plurality of holes for supporting plants with their roots projecting through the bottom of said holes,
feeding means comprising;
spraying means for supplying a hydroponic solution onto the roots of said plants, and
pumping means, connected to said spraying means, for supplying said hydroponic solution to said spraying means,
said spraying means being movable in said longitudinal direction, and
driving means, connected to said feeding means, for moving said feeding means in said longitudinal direction.

12. A hydroponic culture system as defined in claim 11, wherein
said driving means comprises an endless driving chain, and wherein
said pumping means comprises,
a feed pump, and
a flexible hose, connected at one end to said feed pump and at its other end to said spraying means.

13. The hydroponic culture system as defined in claim 12, wherein a plurality of said angle panels are disposed in series and in a plurality of rows.

14. The hydroponic culture system as defined in claim 12, wherein said angle panel is disposed to be detachable and movable in the longitudinal direction of said angle panel.

15. The hydroponic culture system as defined in claim 12, wherein said angle panel has a substantially constant inverted-V cross section in a plane transverse to said longitudinal direction.

16. A hydroponic culture system as defined in claim 11, further including;
means for supplying said hydroponic solution to said spraying means,
said spraying means being movable in said longitudinal direction,
detecting means, for detecting the position of said spraying means when in a first and second position, said first position at one end of said row and said second position at the other end of said row.

17. The hydroponic culture system as defined in claim 16, wherein a plurality of said angle panels are disposed in series and in a plurality of rows.

18. The hydroponic culture system as defined in claim 16, wherein said angle panel is disposed to be detachable and movable in the longitudinal direction of said angle panel.

19. The hydroponic culture system as defined in claim 16, wherein said angle panel has a substantially constant inverted V-cross section in a plane transverse to said longitudinal direction.

20. The hydroponic culture system as defined in claim 16, wherein said spraying means comprises a base plate and a plurality of spray nozzles disposed on a stand mounted on said base plate, and said driving means comprises a drive motor disposed at a lower side of said base plate and a sprocket mounted on a rotary shaft of said drive motor, said sprocket engaging a chain disposed along the longitudinal direction of said angle panels.

21. A hydroponic culture system having a plant cultivation room comprising:
a plurality of angle panels disposed in a plurality of rows, each row having individual angle panels disposed in series,
transport means for transporting each of said individual angle panels in a longitudinal direction,
each of said individual angle panels arranged to be detachably removed from the transport means which carry it,
each of said individual panels having a plurality of holes for supporting plants with their roots projecting through the bottom of said holes,
each of said individual panels being a single integral panel extending substantially between the vertical extent of said transport means, and
feeding means comprising;
spraying means for supplying a hydroponic solution onto the roots of said plants, and
pumping means, connected to said spraying means, for supplying said hydroponic solution to said spraying means,
said spraying means being movable in said longitudinal direction,
driving means, connected to said feeding means, for moving said feeding means in said longitudinal direction.

a hydroponic culture system having a plant cultivation room, comprising:
- at least one angle panel having a longitudinal dimension and a plurality of holes for supporting plants with roots projecting through the bottom of said holes,
- feeding means, comprising;
  - spraying means, for supplying a hydroponic solution onto the roots of the plants, movable in a longitudinal direction of said angle panel,
  - pumping means for supplying said hydroponic solution to said spraying means,
- driving means, for moving said spraying means along said longitudinal direction,
- said angle panel, said feeding means and said driving means all arranged in said plant cultivation room, and
- environment control means, comprising;
  - measuring means for measuring the concentration of carbon dioxide in sampled air,
  - air-conditioning means,
    - duct means for conducting air between a space defined by said plant cultivation room and said air-conditioning means,
  - said measuring means measuring the air sampled in said duct means,
  - outlet port means communicating with said duct means,
  - carbon dioxide supply means including a valve means,
- supply duct means connected to said carbon dioxide supply means and said outlet port means, and
- control means for controlling said valve means as a function of the concentration of carbon dioxide measured by said measuring means, whereby the concentration of carbon dioxide in said space defined by said plant cultivation room can be adjusted to a predetermined value.

22. A hydroponic culture system as defined in claim 21, wherein said angle panel being arranged within a plant cultivation room shielded from sunlight, said system further comprising a lighting means for irradiating said plants supported on said angle panel.

23. A hydroponic culture system as defined in claim 21, further comprising reflecting means for reflecting light radiated from said lighting means to said plants wherein said reflecting means are disposed on inner surfaces of said plant cultivation room and on surfaces of said angle panel.

24. A hydroponic culture system as defined in claim 21, wherein said driving means comprises an endless driving chain, and said pumping means comprises a feed pump, and a flexible hose connected at one end to said feed pump and at its other end to said spraying means.

25. The hydroponic culture system as defined in claim 21, wherein said driving means are mounted on said spraying means, and wherein said system further comprises first and second position detecting means for detecting the position of said spraying means, said first position detecting means being disposed at both ends of the row of said angle panels and said second position detecting means being disposed on said spraying means.

26. The hydroponic culture system as defined in claim 25, wherein said spraying means comprises a base plate and a plurality of spray nozzles disposed on a stand mounted on said base plate, and said driving means comprises a drive motor disposed at a lower side of said base plate and a sprocket mounted on a rotary shaft of said drive motor, said sprocket engaging a chain disposed along the longitudinal direction of said angle panels.

27. The hydroponic culture system as defined in claim 21, wherein said angle panel has a substantially constant inverted V-cross section in a plane transverse to said longitudinal direction.

28. A hydroponic culture system as defined in claim 11, wherein said transport means comprises,
- a fixed supporting means, and wherein said angle panels comprise slidable supporting means which are slideably supported by said fixed supporting means.

* * * * *